United States Patent
Hegde et al.

(10) Patent No.: US 9,507,823 B2
(45) Date of Patent: Nov. 29, 2016

(54) AUTOMATED METADATA LOOKUP FOR LEGACY SYSTEMS

(71) Applicant: SAP SE, Walldorf (DE)

(72) Inventors: Sumanth Hegde, Bangalore (IN); Tarun Shetty, Bangalore (IN)

(73) Assignee: SAP SE, Walldorf (DE)

( * ) Notice: Subject to any disclaimer, the term of this patent is extended or adjusted under 35 U.S.C. 154(b) by 258 days.

(21) Appl. No.: 14/307,777

(22) Filed: Jun. 18, 2014

(65) Prior Publication Data

US 2015/0370868 A1    Dec. 24, 2015

(51) Int. Cl.
*G06F 17/30* (2006.01)

(52) U.S. Cl.
CPC ... *G06F 17/30451* (2013.01); *G06F 17/30427* (2013.01); *G06F 17/30893* (2013.01)

(58) Field of Classification Search
None
See application file for complete search history.

(56) References Cited

U.S. PATENT DOCUMENTS

| | | | | |
|---|---|---|---|---|
| 5,857,194 | A * | 1/1999 | Kelliher | G06F 17/30569 |
| 6,374,263 | B1 * | 4/2002 | Bunger | G06F 17/30451 |
| 7,430,562 | B1 * | 9/2008 | Bedell | G06F 17/30463 |
| 8,880,463 | B2 * | 11/2014 | Hackmann | G06F 17/30569 707/609 |
| 8,982,129 | B1 * | 3/2015 | Broekhuijsen | G06F 17/30961 345/440 |
| 2004/0111389 | A1 * | 6/2004 | Pudipeddi | G06F 9/4411 |
| 2004/0181543 | A1 * | 9/2004 | Wu | G06F 17/30572 |
| 2007/0061304 | A1 * | 3/2007 | Gung | G06F 17/30557 |
| 2009/0132345 | A1 * | 5/2009 | Meyssami | G06Q 10/10 705/7.33 |
| 2013/0191328 | A1 * | 7/2013 | Hackmann | G06F 17/30569 707/609 |
| 2014/0101147 | A1 * | 4/2014 | Foody | G06F 17/30401 707/729 |
| 2015/0120745 | A1 * | 4/2015 | James | G06F 17/30306 707/741 |

* cited by examiner

*Primary Examiner* — Richard Bowen
(74) *Attorney, Agent, or Firm* — Jones Day

(57) ABSTRACT

A method and system for accessing data in a de-commissioned legacy system are provided. Data are automatically extracted from the legacy system, although data structure(s) of the legacy system might not be known, by finding views corresponding to a query for the data. Attributes, metadata, and/or fields ("attributes") can be parsed from the query. Tables and/or fields including the parsed attributes are identified. Views can be then identified, where the views contain the tables and/or fields including the parsed attributes. The views can be ranked in an order from those that include the greatest number of parsed attributes to those including the least number of parsed attributes. A data request understandable by the legacy system, e.g. a packet, can then be formed using the least number of views, where the views can collectively include all of the parsed attributes.

20 Claims, 5 Drawing Sheets

100

200

300

500

AUTOMATED METADATA LOOKUP FOR LEGACY SYSTEMS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND INFORMATION

Enterprise computing, which includes enterprise resource planning (ERP), integrates various organizational systems to facilitate production and transaction of goods and services. For example, ERP systems provide support to processes such as production planning, sales and distribution, finance, and human resource management and handle functionalities for users. Thus, implementation and integration of ERP systems is an important but challenging task for organizations.

Enterprise computing systems can consist of several different systems. Enterprise system landscapes, especially those of large and/or complex organizations, often include active systems supplied by different vendors of enterprise systems such as SAP®, Oracle®, Salesforce®, etc. Changes in the business of companies impact their enterprise system landscapes. Different vendors and sometimes different generations of enterprise computing systems provided by a particular vendor have databases that organize and store data in unique and/or proprietary manners. For instance, when one company acquires or merges with another company, integration of the business and operations of the resulting business includes integration of enterprise systems as well. The two (or more) companies whose enterprise systems need to be integrated may have systems supplied by different vendors.

Additionally, enterprise system landscapes can become more complex over time, for example, as systems become obsolete and/or as companies add more systems to accommodate different regions, countries, types of business, etc. As such, many companies tend to have heterogeneous enterprise systems. At the same time, there can be significant benefits to consolidating the systems. For example, licensing, maintenance, and personnel costs may be reduced by consolidating enterprise computing systems.

DETAILED DESCRIPTION

The present invention provides for a method and system for accessing enterprise computing systems. More specifically, the present invention relates to a method and system for extracting data from consolidated enterprise computing systems, including heterogeneous enterprise computing systems which may include data storage structures unknown to the method.

Figure 1:
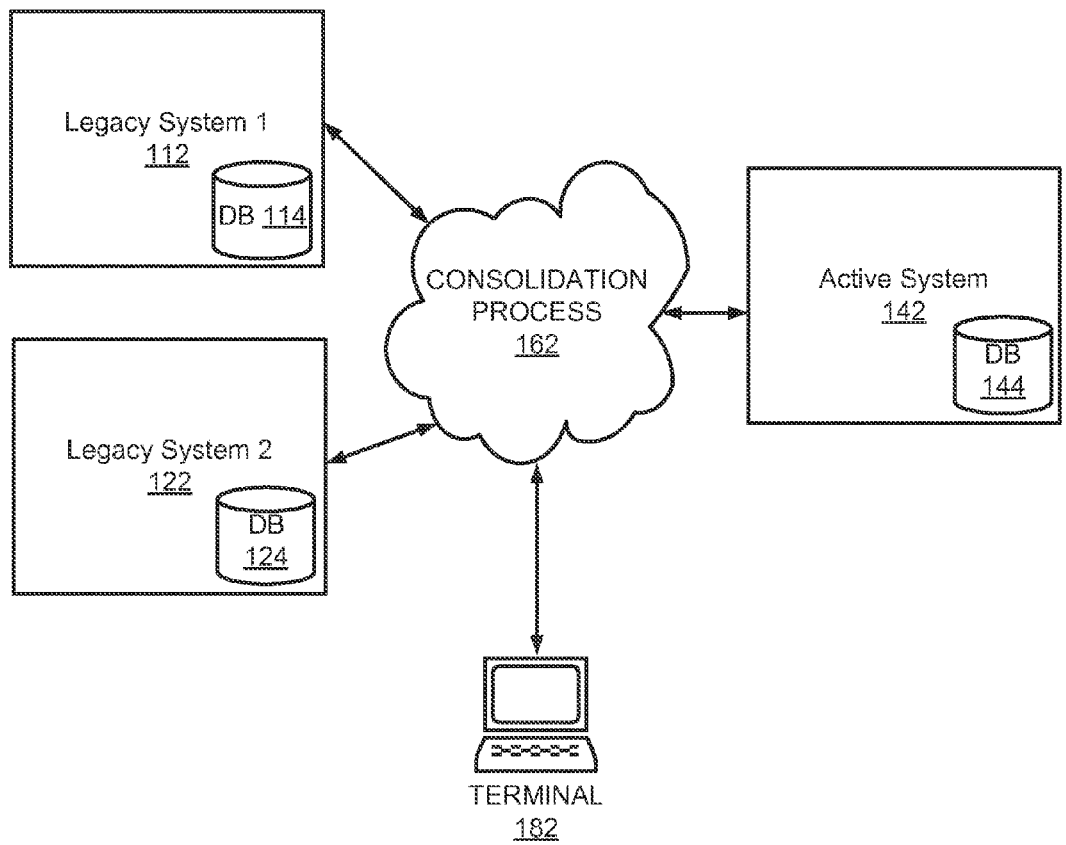
FIG. 1 illustrates an exemplary system consolidation according to an example embodiment.

FIG. 1 illustrates an exemplary system consolidation 100 according to an example embodiment. The system consolidation 100 includes a two legacy systems 112, 122 that can be consolidated into an Active System 142 via a consolidation process 162. During a process of system consolidation, two or more enterprise systems 112, 122 can be consolidated into one or more enterprise systems 142, simplifying the system landscape and thus reducing costs. Each of the legacy systems can include respective database(s) 114, 124 for storing data that can be combined in the consolidation process 162. After consolidation, some or all of the legacy data stored in the legacy system databases 114, 124 can be copied or moved to active database 144, and the legacy systems 112, 122 can be removed from use. Although legacy data is moved to active system 142, it can generally remain in the legacy system format. The consolidation process 162 can be controlled by a terminal 182.

One exemplary type of consolidation is consolidating systems of different types into system(s) of the same type. Such a system consolidation may be motivated, e.g., by a merger or acquisition of companies. One (e.g., a parent) company may run a system from a particular vendor, for example, SAP®, while another (e.g., an acquired) company may run a system from another vendor, for example, Oracle®. As a part of a merger and acquisition process, a resulting company may access the consolidated data of the two companies using a single type of system, e.g., SAP®. Although the example is provided with two types of systems, more than two companies may be consolidated. The consolidation may also result in more than one system.

Another exemplary type of consolidation is consolidating systems of one type, e.g. SAP®, into fewer systems of the same type. For example, this type of system consolidation may be motivated by a company's desire to simplify a computing landscape by reducing the number of different systems it uses. A company may determine that its business units are running multiple similar systems that can be consolidated. Consolidation of different systems into fewer and/or homogenous systems can reduce costs associated with hardware and software upgrades and backups, personnel, maintenance down times, etc.

A consolidation can also include a system de-commissioning. In a first step, "open" data and processes from a legacy system(s) 112, 122 can be moved (e.g., copied) from the legacy system(s) to an active system 142. In a second step, "old" or "closed" data and processes in the legacy systems can be preserved, and the legacy systems can be decommissioned from use. "Open" data and processes can include data and processes that have been used within a particular time frame, or that the consolidation process 162 can deem is likely to be useful to or accessed by the active system 142. "Old" or "closed" data and processes can include data that have not been used within a particular time frame, or that the consolidation process 162 can deem is not likely to be useful to or accessed by the active system 142.

Once systems have been consolidated, software applications can be adapted to access legacy data. For example, SAP® ILM (Information Lifecycle Management) includes functionalities for maintaining legally compliant archiving and also loading data from archives, e.g., for auditing purposes. SAP® ILM includes a component, Retention Warehouse (RW), which selectively loads archived data based on queries. In order to effectively access legacy data, software applications such as SAP® ILM form queries understandable by the legacy system.

The decommissioned (or legacy) system may use data models different from the active system. These data models are often unknown to the active system. For example, the tables and fields in the legacy system can be structured differently from the current system. When data is requested from the legacy system, the request needs to be translated to a command or request meaningful to the legacy system to extract data from the appropriate tables, views, and/or fields of the legacy system. One challenge in the data extraction process is identifying tables and/or fields responsive to the query. Another challenge is efficiently joining data from more than one table, where applicable. Depending on the query, data extraction may involve retrieving data from multiple tables and joining the result because data relevant to the request may be stored across several tables in the legacy system. Hence the process of data extraction from legacy systems is complex, time-consuming, and error prone, especially when performed manually. Identifying the appropriate and related tables and fields can be cumbersome, because enterprise system data models are complex and may include numerous (e.g., thousands of) tables. Thus, the inventors perceive a need to automate metadata look up to extract data from the legacy systems and to equip software applications for accessing legacy systems with these functionalities.

Figure 2:
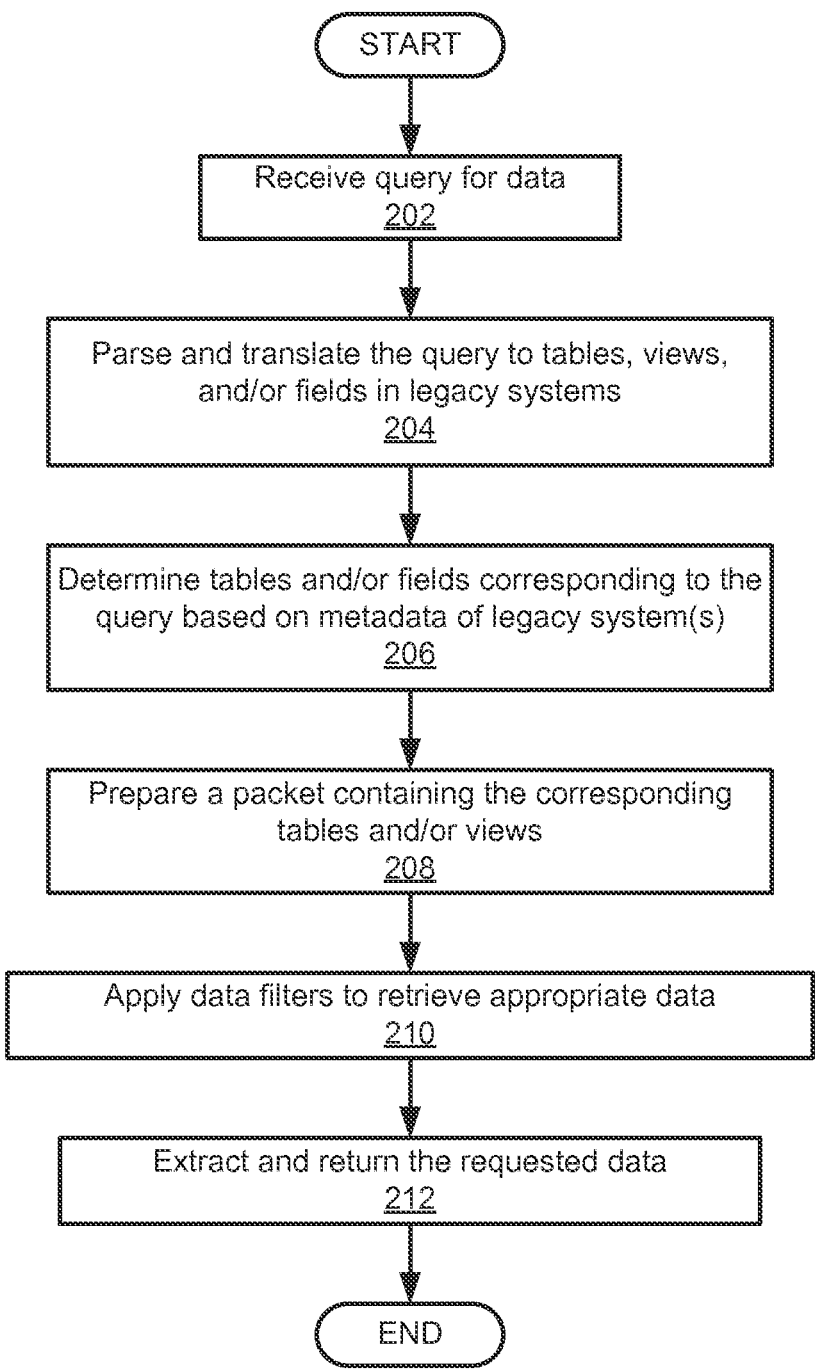
FIG. 2 is a flowchart of an exemplary method for retrieving data from a legacy system according to an example embodiment.

FIG. 2 is a flowchart of an exemplary method 200 for extracting data from a legacy system. The method 200 can identify one or more views containing data pertinent to a query and can dispense with the need to join tables to return requested data. A view, which is a result set of a stored query on data, can be generated from usage of a database. For a legacy system, views can be generated by interactions of developers and consultants with the system. The views can be associated with the legacy system, e.g., as metadata, and passed with the legacy system data in the process of consolidation. Views can also be queried in the same or a similar manner as querying a persistent database collection object.

In a first step 202, the method 200 can receive a request for data, which may or may not be in a legacy system. Responsive to the query for data, the method 200 can parse and/or translate the query to identify tables, views, and/or fields in the legacy system that would return the requested data or be responsive to the required data. In an embodiment, the query is parsed to extract attributes, which may be found in the legacy system database. Often the attributes of a query are related to each other. There is therefore a high likelihood of finding one or more views that contains these attributes. A view can be used to extract data responsive to the attributes without a need to join tables, because joined tables may be reflected by a definition of the view. Thus, identification and prioritization of views can be useful for efficiently extracting data from legacy systems. The method 200 can then proceed to step 206 in which the method determines tables and/or fields corresponding to the query based on metadata of the legacy system from which data is sought.

Figure 3:
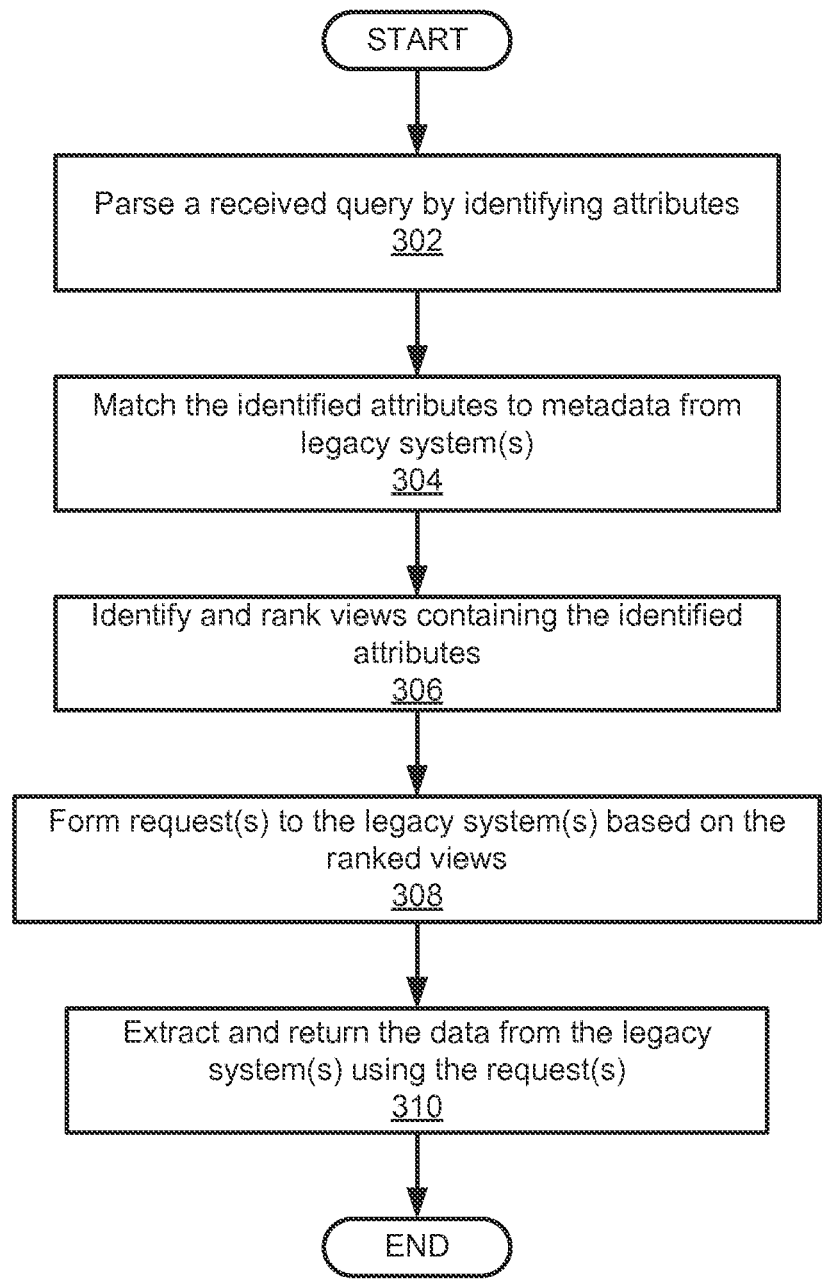
FIG. 3 is a flowchart of an exemplary method for retrieving data from a legacy system according to an example embodiment.

The process of identifying tables and/or fields corresponding to query attributes is described in further detail in relation to FIG. 3. Once the views are identified in step 206 and a "packet" containing the identified tables and/or views is constructed in step 208, the method 200 can then retrieve requested data from the legacy system. For example, data can be retrieved by applying data filters according to packet instructions in step 210. The packet can include instructions on how and what to load, and can be used to report aspects of decommissioned data. The method 212 can then extract and return the requested data from the legacy system in step 212.

FIG. 3 is a flowchart of an exemplary method 300 for retrieving data from a legacy system. The method 300 can identify various views responsive to a data request and can look up data from the legacy system using the views. Because the views are result sets of stored queries on data of the legacy system, the legacy system understands the views and queries formed from the views. In a first step 302, the method 300 can receive a request for data and can translate the request to a set of attributes. The attribute can be, for example, an order amount or identification for a good. Step 302 can be performed manually. The method 300 can then proceed to step 304 in which the method can match the identified attributes to metadata from the legacy system. For instance, once the attributes are found, metadata from the legacy system can be scanned to find matches for the attributes. If a match for the attribute is found, corresponding tables can be identified, e.g., stored in a list. Attributes can be found and matched by looking up a technical description in the legacy system. In step 306, based on the tables identified, views can be scanned to determine which ones include the identified tables. Further, in step 306, the method 300 can rank the views based on the number of attributes contained in the view. For instance, the views can be scanned to determine the number of requested attributes each view contains. In an embodiment, a higher rank corresponds to a view containing more attributes compared with a lower-ranked view. In step 308, the method 300 can form a request to the legacy system based on the ranked views. For example, the packet can be formed such that a predetermined number (e.g., some or all) attributes are included. For example, a packet can be initialized with the highest ranked view. If the view does not contain all of the attributes, the next highest ranked view can be added, and further lower-ranked views are included until the predetermined number of attributes is included. The method 300 can then proceed to step 310 in which the data requested by the packet can be extracted and returned from the legacy system.

Figures 4A, 4B, 4C:
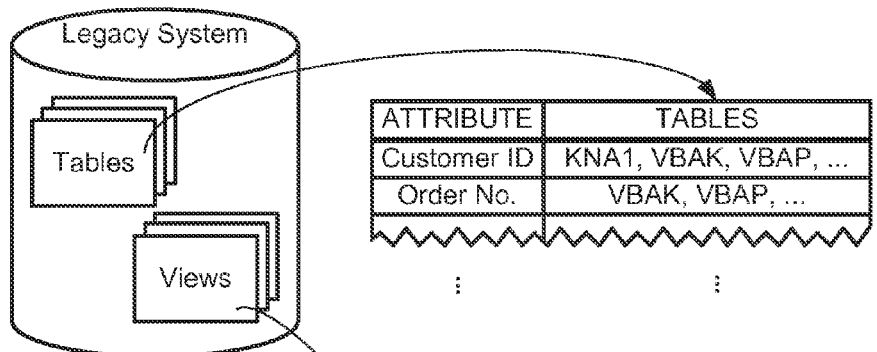
FIG. 4A illustrates various attributes associated with tables in legacy data.
FIG. 4B illustrates views associated with various tables in legacy data.
FIG. 4C illustrates rankings of views and associated tables in legacy data according to an example embodiment.

An example application of method 300 for extracting data from an example legacy system is illustrated with the aid of FIGS. 4A, 4B, and 4C. In the example, the attributes requested from the legacy system are: Customer ID, Order Number, Order Date, Order Amount, and Product ID. In step 302, the attributes can be identified by the method 300 and formed into a list. In step 304, the method can scan the metadata of the legacy system to determine tables corresponding to each of the requested attributes. FIG. 4A illustrates tables associated with various attributes in legacy data. For example, the requested attribute "Customer ID" can be found in tables KNA1, VBAK, and VBAP. In step 306, the method 300 can identify views associated with the tables determined to correspond to the attributes. FIG. 4B illustrates views associated with various tables in legacy data. For example, table KNA1 (associated with the attribute Customer ID) can be returned by any of the following views: V_KNA1, V_ORDERS, and V_CUSTOMERS. In step 306, the method 300 can also rank the views. FIG. 4C illustrates an exemplary ranking of views and associated tables in legacy data. For example, V_ORDERS_HISTORY is ranked the highest, because it includes the largest number of requested attributes: Customer ID, Order Number, Order Date, and Order Amount, which accounts for four out of the five requested attributes. V_ORDERS is ranked lower than V_ORDERS_HISTORY because it contains three out of the five requested attributes, i.e., fewer attributes than the number of identified attributes contained in V_ORDERS_HISTORY.

In step 308, method 300 can form a request to legacy system based on the ranked views, for example selecting a combination of views that covers a maximum number of requested attributes using the minimal number of views. In the example illustrated in FIG. 4C, the method 300 can select V_ORDER_HISTORY and V_ITEMS, because together, they cover all of the requested attributes: Customer ID, Order Number, Order Date, Order Amount, and Product ID. The combination of V_ORDER_HISTORY, V_ORDERS, and V_ITEMS would also include all of the attributes, but can be considered less optimal, because V_ORDERS includes attributes that are covered by the combination of the other two views. Using the views, the requested attributes can then be extracted from the legacy system.

In an alternative embodiment, instead of using views, legacy data can be extracted with the aid of user interfaces (UIs), e.g., a screen that includes requested attributes. For example, UI screenshots/metadata and the results generated by user interactions with the UI can be stored and associated with legacy systems. By identifying UIs that include attributes that are currently requested, the resultant screens from the UIs can be scanned to determine information relevant to the currently-requested attributes. Thus, in a manner similar to using views, data can be retrieved from a legacy system whose memory structures the present processor may not know.

Figure 5:
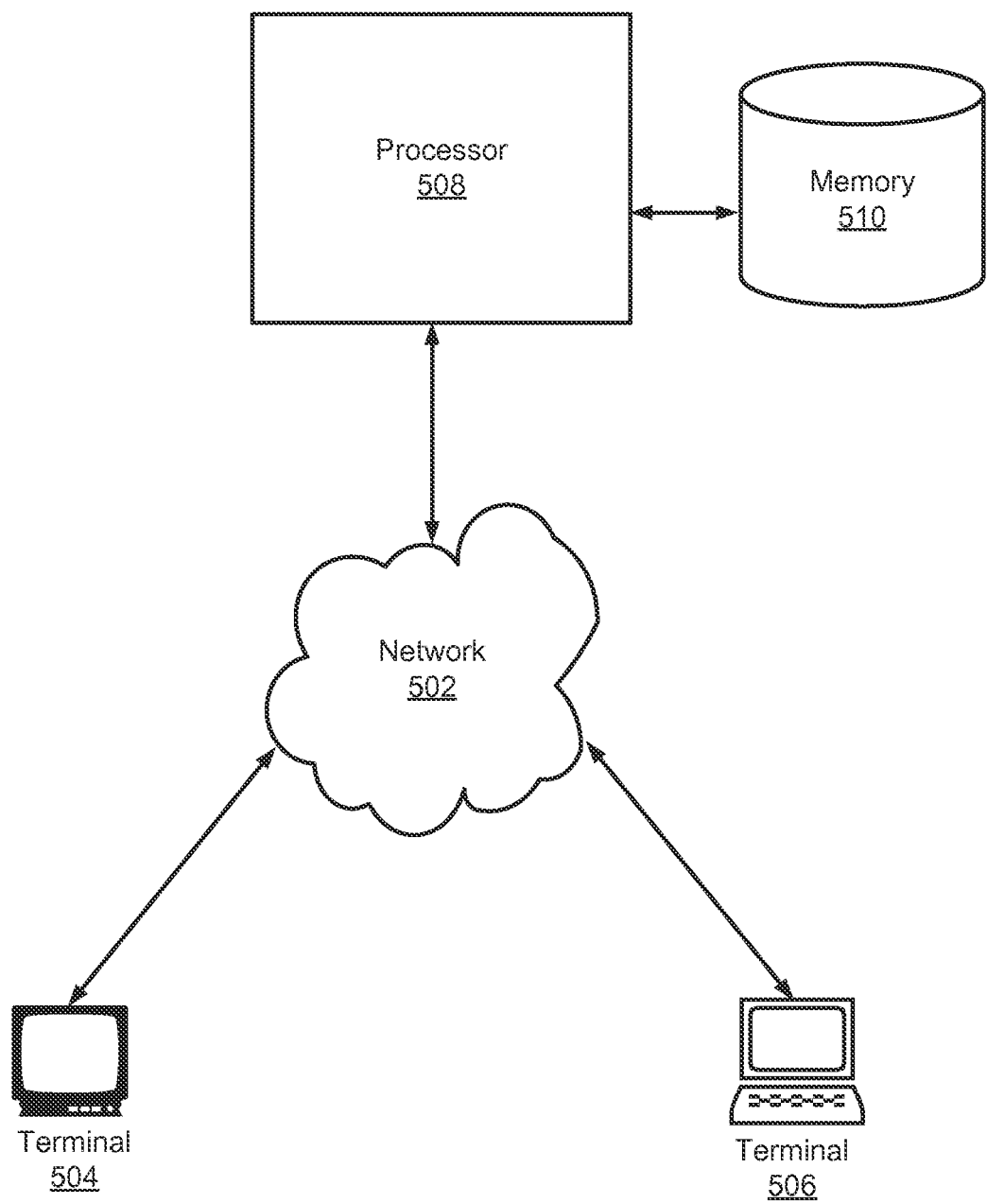
FIG. 5 is a block diagram of a system implementing the methods and systems described herein and according to an example embodiment.

FIG. 5 shows an example system 500 that includes a processor 508 in communication with a computer-readable medium 510. The computer readable medium 510 can be a database internal to the processor 508, external to the processor 508, external server, or external storage means. The computer-readable medium 510 can include instructions executable by the processor 508, such that, when the processor 508 executes various portions of the instructions, the instructions cause the processor 508 to perform the various methods described herein. The example system further includes terminals 504 and 506. For example, one terminal 504 can be used by a front-end user to interact with system 500, and the other terminal 506 can be used by a back-end user to interact with the system 500. The processor 508 and clients 504 and 506 can be in communication via network 502, which can be the Internet. Each of the clients 504 and 506 can access the processor 508 and any applications stored thereon via the network 502.

It should be appreciated that the present invention can be implemented in numerous ways, including as a process, an apparatus, a system, a computer processor executing software instructions, a mobile device, a smart device, a mobile application, or a computer readable medium such as a computer readable storage medium, or a computer network wherein program instructions are sent over optical or electronic communication or non-transitory links. It should be noted that the order of the steps of disclosed processes can be altered within the scope of the invention, as noted in the appended Claims and in the description herein.

Although referred to as a "legacy system," in some embodiments, the legacy systems 112, 122 can remain actively used for a period after consolidation and be occasionally accessed. Similarly, although referred to as an "active system," in some embodiments, the active system 142 may not be actively used before consolidation is completed. In FIG. 1, the terminal is illustrated as a personal computer, but the principles of the present invention are not so limited. Embodiments of the present invention find application with laptop, servers, and smart phones, and other computing devices.

Although the foregoing invention has been described in some detail for purposes of clarity of understanding, it will be apparent that certain changes and modifications can be practiced within the scope of the appended claims. The present invention can be practiced according to the claims without some or all of these specific details. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A computer-implemented method for retrieving data from a legacy system, the method comprising:
   receiving, by a processor, a query for the data;
   extracting, using the processor, attributes from the query by parsing the query;
   identifying, using the processor, a plurality of tables of the legacy system by scanning metadata of the legacy system, wherein each of the tables includes at least one of the attributes from the query;
   identifying, using the processor, a plurality of views, wherein the views contain at least one of the plurality of tables;
   ranking, using the processor, the plurality of views based on a quantity of the attributes contained in the respective view, wherein the quantity of the attributes directly correlates to placement of the plurality of views in a ranking hierarchy;
   constructing, using the processor, a packet using a subset of the plurality of views such that a maximum number of attributes are included in a minimum number of views, wherein the packet includes loading instructions associated with the plurality of views; and
   extracting and returning, using the processor, the requested data from the legacy system by applying filters based on instructions in the packet;
   wherein the legacy system has a memory structure different from a memory associated with the processor that implements the method.

2. The method according to claim 1, wherein the packet is iteratively constructed by selecting a view from the plurality of views containing more attributes than other views of the plurality of views until all of the identified attributes are contained by the views forming the packet.

3. The method according to claim 1, wherein each view of the plurality of views is a result set of a stored query on associated data in the legacy system and is defined by manipulations of the legacy system.

4. The method according to claim 1, wherein the requested data is extracted and returned by forming a command such that a set of the highest ranked views collectively including a pre-defined number of the attributes is used to extract the data from the memory.

5. A computer-implemented method for retracing data from a memory, the method comprising:
   receiving, by a processor, a query for the data;
   parsing, using the processor, the query to extract attributes;
   identifying, using the processor, at least one table including the attributes, wherein the at least one table is stored in the memory;
   identifying, using the processor, at least one view containing the at least one table, wherein the at least one view is associated with the memory;
   ranking, using the processor, the at least one view based on a quantity of the attributes that the respective view includes, wherein the quantity of the attributes directly correlates to placement of the at least one view in a ranking hierarchy; and
   extracting and returning the requested data using the ranking of the at least one view.

6. The method according to claim 5, wherein the requested data is extracted and returned by forming a command such that a set of the highest ranked views collectively including a pre-defined number of the attributes is used to extract the data from the memory.

7. The method according to claim 6, wherein the pre-defined number of the attributes is all of the attributes.

8. The method according to claim 5, wherein each view of the plurality of views is a result set of a stored query on associated data and is defined by manipulations of the memory.

9. The method according to claim 5, wherein a structure of the memory is unknown to the method.

10. The method according to claim 5, wherein the attributes includes at least one of metadata and fields of the memory.

11. A computer-implemented method of retrieving data from a memory, the method comprising:
    receiving, by a processor, a query for the data;
    indexing, using the processor, the query by identifying attributes forming the query;
    scanning, using the processor, metadata of the memory for tables including the identified attributes;
    identifying, using the processor, views including the tables with the identified attributes;
    ranking, using the processor, the views based on a quantity of the identified attributes that a respective view contains, wherein the quantity of the identified attributes directly correlates to placement of the views in a ranking hierarchy; and
    forming, using the processor, a request for data based on the ranked views.

12. The method according to claim 11, wherein the scanning includes:
    scanning, using the processor, through fields of the tables of the memory; and
    listing, using the processor, the tables found to contain the identified attributes.

13. The method according to claim 11, wherein the views are ranked such that the higher ranked a view, the more identified attributes the view contains.

14. The method according to claim 11, wherein the requested data is extracted and returned by formatting a data request such that a set of the highest ranked views, collectively including a pre-defined number of the identified attributes, is used to extract the data.

15. The method according to claim 14, wherein the pre-defined number of the identified attributes is a total number of the identified attributes.

16. The method according to claim 11, wherein each view is a result set of a stored query on associated data and is defined by manipulations of the memory.

17. The method according to claim 11, wherein the memory is a legacy system having a memory structure different from memory associated with the processor that implements the method.

18. The method according to claim 17, further comprising loading the requested data on a user interface associated with the processor that implements the method, wherein the user interface is subsequently scanned to determine information relevant to the requested data based on user interactions with the user interface.

19. A non-transitory computer-readable storage device storing program instructions that, when executed, cause an executing device to perform a method for retrieving data from a legacy system, the method comprising:
    receiving, by a processor, a query for the data;
    parsing, using the processor, the query to extract attributes;
    identifying, using the processor, at least one table including the attributes, wherein the at least one table is stored in the memory;
    identifying, using the processor, at least one view containing the at least one table, wherein the at least one view is associated with the memory;
    ranking, using the processor, the at least one view based on a quantity of the attributes that the respective view includes, wherein the quantity of the attributes directly correlates to placement of the at least one view in a ranking hierarchy; and
    extracting and returning the requested data from the legacy system by applying filters using the ranking of the at least one view;
    wherein the legacy system is a system having a memory structure different from the storage device.

20. The method according to claim 19, wherein the requested data is extracted and returned by forming a command such that a set of the highest ranked views collectively including a pre-defined number of the attributes is used to extract the data from the memory.

* * * * *